(12) United States Patent
Dills

(10) Patent No.: US 11,478,713 B1
(45) Date of Patent: Oct. 25, 2022

(54) AUTOMATED DETECTION OF EMERGENT BEHAVIORS IN INTERACTIVE AGENTS OF AN INTERACTIVE ENVIRONMENT

(71) Applicant: Electronic Arts Inc., Redwood City, CA (US)

(72) Inventor: Thomas Bradley Dills, Longwood, FL (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/107,163

(22) Filed: Nov. 30, 2020

Related U.S. Application Data

(62) Division of application No. 16/130,854, filed on Sep. 13, 2018, now Pat. No. 10,881,964.

(51) Int. Cl.
*A63F 13/79* (2014.01)
*G06K 9/62* (2022.01)
*A63F 13/75* (2014.01)
*G06N 20/00* (2019.01)

(52) U.S. Cl.
CPC ............. *A63F 13/75* (2014.09); *A63F 13/79* (2014.09); *G06K 9/6218* (2013.01); *G06N 20/00* (2019.01)

(58) Field of Classification Search
None
See application file for complete search history.

(56) References Cited

U.S. PATENT DOCUMENTS

| 2007/0260567 A1 | 11/2007 | Funge |
| 2013/0123003 A1 | 5/2013 | Williams |
| 2017/0259178 A1 | 9/2017 | Aghdaie |
| 2017/0339168 A1 | 11/2017 | Balabine |

*Primary Examiner* — Damon J Pierce
(74) *Attorney, Agent, or Firm* — McDermott Will & Emery LLP

(57) ABSTRACT

Various aspects of the subject technology relate to systems, methods, and machine-readable media for automated detection of emergent behaviors in interactive agents of an interactive environment. The disclosed system represents an artificial intelligence based entity that utilizes a trained machine-learning-based clustering algorithm to group users together based on similarities in behavior. The clusters are processed based on a determination of the type of activity of the clustered users. In order to identify new categories of behavior and to label those new categories, a separate cluster analysis is performed using interaction data obtained at a subsequent time. The additional cluster analysis determines any change in behavior between the clustered sets and/or change in the number of users in a cluster. The identification of emergent user behavior enables the subject system to treat users differently based on their in-game behavior and to adapt in near real-time to changes in their behavior.

20 Claims, 9 Drawing Sheets

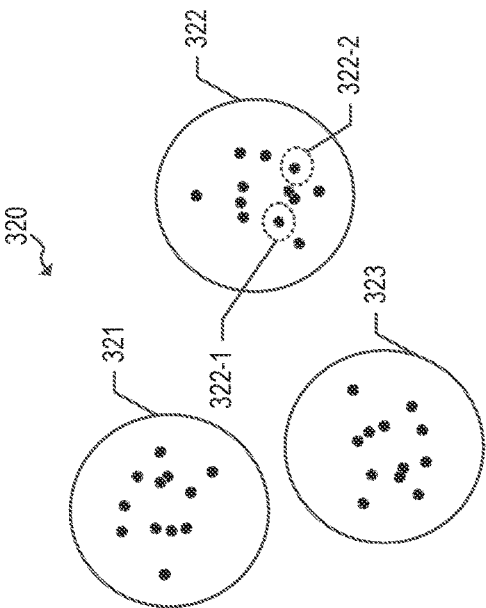
FIG. 3B
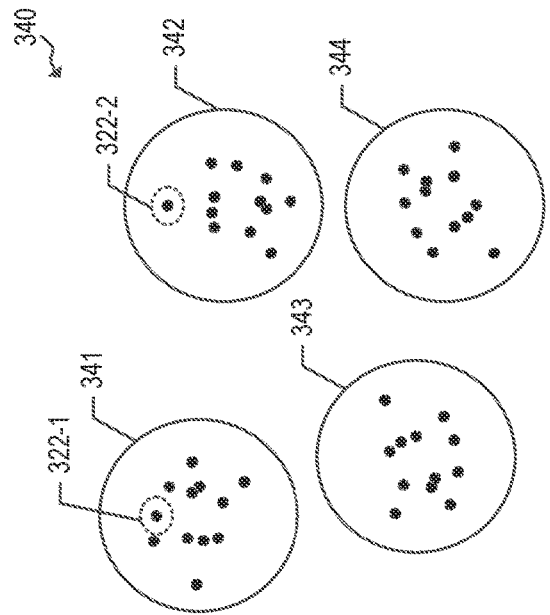
FIG. 3D
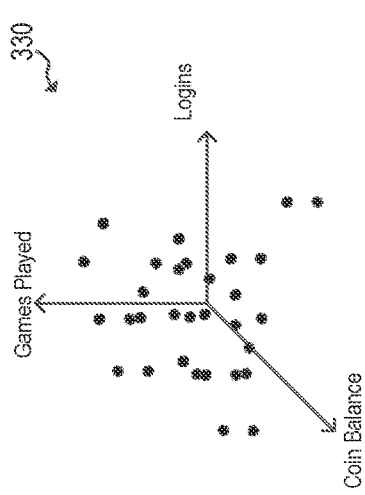
FIG. 3A
FIG. 3C

AUTOMATED DETECTION OF EMERGENT BEHAVIORS IN INTERACTIVE AGENTS OF AN INTERACTIVE ENVIRONMENT

CROSS REFERENCE TO RELATED APPLICATIONS

The present application claims the benefit of priority under 35 U.S.C. 120 as a divisional of U.S. patent application Ser. No. 16/130,854, filed Sep. 13, 2018, now allowed, the disclosure of which is hereby incorporated by reference in its entirety for all purposes.

TECHNICAL FIELD

The present disclosure generally relates to a computer-operated multiuser interactive environment, and more particularly to automated detection of emergent behaviors in interactive agents of an interactive environment.

BACKGROUND

Video games, such as sports-themed and life simulation video games, provide ever increasing realistic game-playing experiences, including interactive environments where players can interact with one another during gameplay. Users in an interactive environment exhibit different behaviors when interacting with the interactive environment. Such behaviors may include malicious activity in the interactive environment, thus potentially opening an avenue for exploiting the interactive environment.

SUMMARY

The subject technology provides for a machine learning enhancement for identifying emergent user behavior. For example, the subject technology relates to anomaly detection for use in a web service (e.g., a game service) to automate the identification of emergent behaviors or emergent users using data analytics and machine learning. The subject technology utilizes a trained machine-learning-based clustering algorithm to group users together based on similarities in behavior. The clusters are processed based on a determination of the type of activity of the clustered users. In order to identify new categories of behavior and to label those new categories, a separate cluster analysis is performed using interaction data obtained at a subsequent time. The additional cluster analysis determines any change in behavior between the clustered sets and/or change in the number of users in a cluster. The identification of emergent user behavior enables the subject system to treat users differently based on their in-game behavior and to adapt in near real-time to changes in their behavior.

According to one embodiment of the present disclosure, a computer-implemented method is provided. The method includes obtaining first interaction data of a participant device in a multiuser session of an interactive environment based on interactions between an interactive agent associated with a user and the interactive environment. The method includes obtaining second interaction data of the participant device based on subsequent interactions between the interactive agent and the interactive environment. The method includes analyzing the first interaction data and the second interaction data with a machine-learning-based cluster analysis model. The method includes determining a behavior signature of each of a plurality of interactive agents based on the analyzed first and second interaction data. The method includes detecting an emergent behavior associated with a cluster comprised of a subset of interactive agents of the plurality of interactive agents with similar behavior signatures. The method also includes adjusting a status of a user corresponding to an interactive agent associated with the detected emergent behavior.

According to one embodiment of the present disclosure, a system is provided including a processor and a memory comprising instructions stored thereon, which when executed by the processor, cause the processor to obtain first user interaction data of a participant device a multiuser session of an interactive environment based on user interactions with the interactive environment at a first time. The instructions cause the processor to determine a first number of clusters from the first user interaction data using a machine-learning-based cluster analysis model. The instructions cause the processor to obtain second user interaction data of the participant device from user interactions with the interactive environment at a second time subsequent to the first time. The instructions cause the processor to determine a second number of clusters from the second user interaction data using the machine-learning-based cluster analysis model. The instructions cause the processor to determine an emergent behavior associated with a cluster from the second number of clusters based on a difference between the first number of clusters and the second number of clusters. The instructions cause the processor to determine whether an interactive agent from the second number of clusters is associated with the emergent behavior. The instructions cause the processor to adjust a status of a user corresponding to the interactive agent when the interactive agent is associated with the emergent behavior. The instructions also cause the processor to maintain the status of the user corresponding to the interactive agent when the interactive agent is not associated with the emergent behavior.

According to one embodiment of the present disclosure, a non-transitory computer readable storage medium is provided including instructions that, when executed by a processor, cause the processor to perform a method. The method includes obtaining first interaction data of a participant device in a multiuser session of an interactive environment based on interactions between an interactive agent associated with a user and an interactive environment. The method includes obtaining second interaction data of the participant device based on subsequent interactions between the interactive agent and the interactive environment. The method includes analyzing the first interaction data and the second interaction data with a machine-learning-based cluster analysis model. The method includes determining a behavior signature of each of a plurality of interactive agents based on the analyzed first and second interaction data. The method includes detecting an emergent behavior associated with a cluster comprised of a subset of interactive agents of the plurality of interactive agents with similar behavior signatures. The method also includes adjusting a status of a user corresponding to an interactive agent associated with the detected emergent behavior.

According to one embodiment of the present disclosure, a system is provided that includes means for storing instructions, and means for executing the stored instructions that, when executed by the means, cause the means to perform a method. The method includes obtaining first interaction data of a participant device in a multiuser session of an interactive environment based on interactions between an interactive agent associated with a user and an interactive environment. The method includes obtaining second interaction data of the participant device based on subsequent interactions between the interactive agent and the interactive environment. The method includes analyzing the first interaction data and the second interaction data with a machine-learning-based cluster analysis model. The method includes determining a behavior signature of each of a plurality of interactive agents based on the analyzed first and second interaction data. The method includes detecting an emergent behavior associated with a cluster comprised of a subset of interactive agents of the plurality of interactive agents with similar behavior signatures. The method also includes adjusting a status of a user corresponding to an interactive agent associated with the detected emergent behavior.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 3A-3D illustrate schematic diagrams depicting a machine-learning-based cluster analysis for automated detection of emergent behaviors in interactive agents of an interactive environment.

Figure 1:
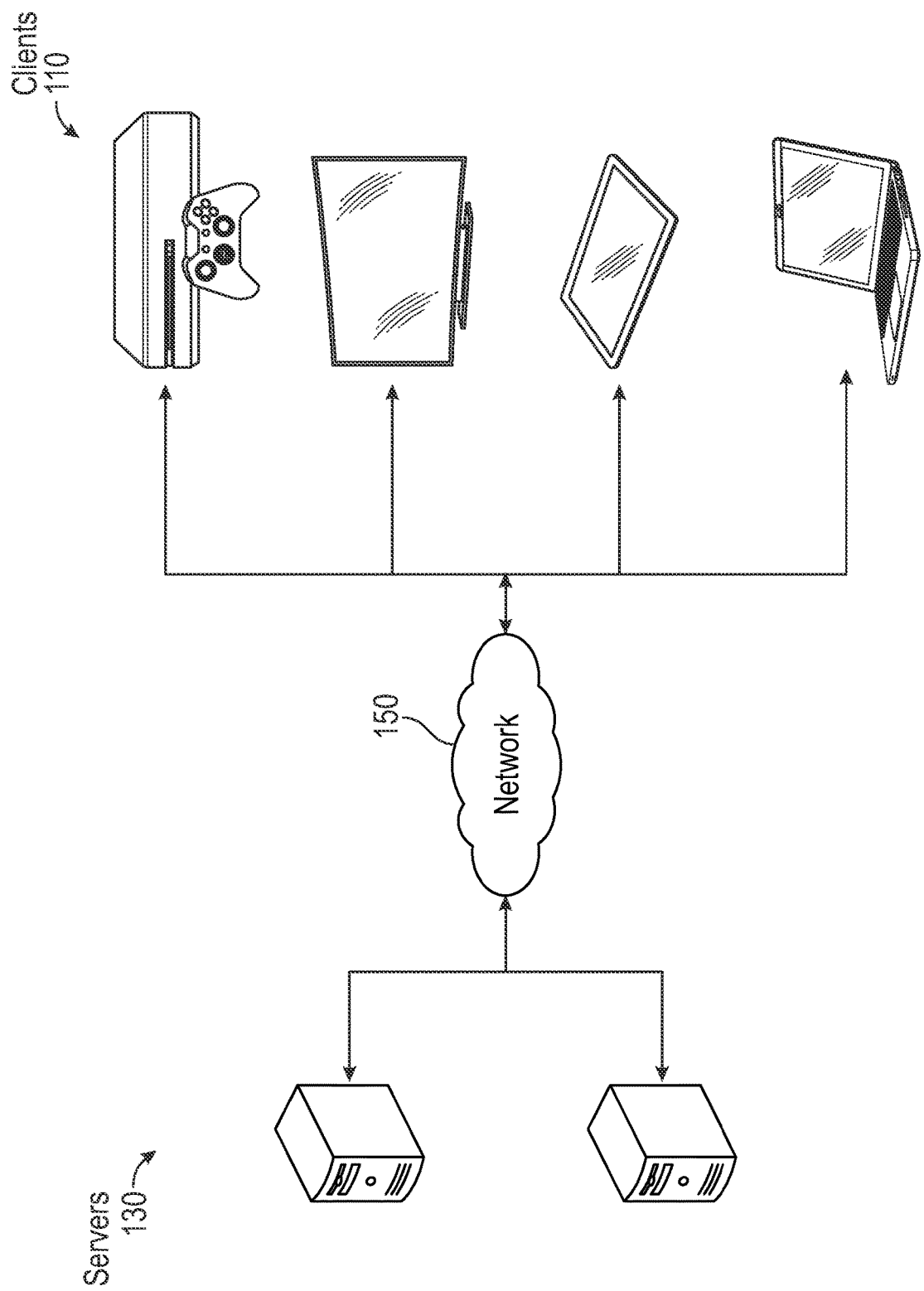
FIG. 1 illustrates an example architecture for automated detection of emergent behaviors in interactive agents of an interactive environment suitable for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "interactive environment" may be used, for example, in reference to a video game or a simulated virtual game, and the term "game" may be interchangeably used with the term "interactive environment." The term "multiuser session" may be used, for example, in reference to a party, a meeting, a gathering, a team, or the like. As used herein, the term "user-controlled agents" may be used, for example, in reference to virtual players or video game players. The term "game client" may be used, for example, in reference to the application rendering a live simulation. As used herein, the term "game client" may be interchangeably used with the term "interactive environment client." The term "player" may be used, for example, in reference to an individual that is interacting with the interactive environment as intended for it to be used. The term "bot" may be used, for example, in reference to a robot (or autonomous agent) that mimics the behavior of a player and is executing server commands for personal gain rather than interacting with the interactive environment for entertainment. As used herein, the term "bot" may be interchangeably used with the term "interactive agent." The term "remote procedure call" may be used, for example, in reference to a function on the server that is intended to be executed by the interactive environment client but is often also executed by an interactive agent. The term "actor" may be used, for example, in reference to an interactive agent or a player that is executing the remote procedure call. In this respect, interactive agents and players may be collectively referred to as actors. The term "behavior" may be used, for example, in reference to a metric describing the state of an actor (e.g., player or interactive agent) or the frequency with which an actor has called (or executed) a remote procedure call (e.g., an actor with a virtual coin balance of 20,000, called the login remote procedure call 14 times over a duration of 24 hours). The term "cluster" may be used, for example, in reference to a group of actors with similar behaviors. The term "clustering algorithm" may be used, for example, in reference to a data analysis technique with machine learning that forms "actors" into clusters by analyzing the similarities and differences between the actors' behaviors. As used herein, the term "content item" may be used, for example, in reference to a digital file that is composed of one or more media elements of different types (text, image, metadata, video, audio, etc.). The content item may include a representation of a digital trading card for use in a computer-operated multiplayer game (e.g., a computer-networked soccer game simulation), where the digital trading card may be a transferrable digital asset related to a certain subject (e.g., person, place or thing) and a description about the subject.

General Overview

Users of the sports-themed video games compete in cooperation games or head-to-head matches with other users to earn points and/or digital trading cards. If a user opens a pack of digital trading cards and receives a number of cards that the user does not desire to keep, the user may visit an online auction house to transfer and/or exchange (e.g., list them for sale) the undesirable cards with other users of the video game. The other users can see the cards that the original user listed for sale, and can buy them from the original user. In this respect, the game (in conjunction with the online auction house) charges a percentage of the proceeds as a form of brokerage fee for the transaction, thereby representing a peer-to-peer marketplace for users to trade with one another.

Traditional gaming interactive environments with online auction houses face some great challenges. For example, as soon as users (e.g., human game players) can transfer content back-and-forth between themselves, the game becomes wrought with sellers (or "coin sellers") and users engaging in fraudulent activities. In some instances, these users run bots (e.g., supervised autonomous interactive agents) that scour an electronic marketplace to buy all the cards that are listed by other users for a relatively low price point (e.g., below market data trends). In many instances, these bots are instructed to purchase these items at the near instant in time when the item is listed on the electronic marketplace. These bots are also instructed to re-list the purchased items for a relatively higher value from the relatively low purchase price point. These users gather electronic currency data (e.g., digital coins) over time in this manner, and eventually these users accumulate a significant amount of digital coins (e.g., millions or billions of digital coins) in an account associated with the game. This disproportionate accumulation of digital coins creates a secondary market that is outside of the electronic marketplace, where electronic currency such as these gathered digital coins are sold and purchased. This secondary market that enables the transfer of digital coins between consumers of the game (e.g., game players) circumvents the electronic marketplace to the detriment of the service provider of the game (e.g., the game publisher). The transfer of one million digital coins, for example, directly into a recipient's account is at no cost to the purchasing user other than the currency that the purchasing user paid outside of the game (and electronic marketplace). This creates an indirect market to purchase digital coins by fraudulently listing items that are not consistent with the market pricing rates in exchange for currency outside of the electronic marketplace, and thereby enables the transfer of digital assets that is a significant detriment to the operation of computer-operated multiplayer games (e.g., ULTIMATE TEAM FIFA, WORLD OF WARCRAFT, DIABLO, etc.) and associated electronic marketplaces.

Existing users interact with different interactive environment applications in different ways and their corresponding user interaction data enables the subject system to categorize these users. For example, one category of players includes competitive players, or users that primarily play on an auction house, or bots that only mine coins, etc. When a feature change is introduced into the interactive environment, the subject system is able to track changes in behavior of the existing categories of players. However, the feature change may result in a new type of player or a new type of "bad actor" to join the interactive environment, thus potentially circumventing efforts to reduce nefarious activity. A change to the interactive environment opens a new, previously undetected, avenue for exploiting the interactive environment or for enjoying the interactive environment. Therefore, it is desirable to detect this emergent class of users. As discussed above, these emergent behaviors pose a significant cost burden for game publishers to maintain a robust interactive environment infrastructure and operation in an attempt to address the concerns created by users that trigger fraudulent activities using autonomous bots that run on networks tied to the electronic marketplaces.

The disclosed system addresses a problem in traditional multi-player game systems that associate gameplay with electronic marketplaces, namely manipulation of gaming-related transactions, such as transfer of digital assets between distributed computing devices and/or unauthorized modification of interactive agents for bolstering gameplay leverage as a means to circumvent the legitimate infrastructure of the interactive environment. This is a problem specifically arising in the realm of computer technology. The problem is addressed by providing a solution also rooted in computer technology, namely, by identifying the emergent behaviors and/or emergent users in the interactive environment and changing the status of users associated with such emergent behaviors by purging these users from the interactive environment in order to reduce the number of instances of malicious activity in the interactive environment.

The disclosed system represents an artificial intelligence based entity that utilizes a trained machine-learning-based clustering algorithm to group users together based on similarities in behavior. The clusters are processed and labeled based on a determination of the type of activity (or engagement) of the clustered users. In order to identify new categories of behavior and to label those new categories, a separate cluster analysis is performed using interaction data obtained at a subsequent time. The additional cluster analysis determines any change in behavior between the clustered sets and/or change in the number of users in a cluster. The subject technology automatically detects the different categories of behavior and automatically identifies behavior determined as emergent behavior. In some aspects, the clusters are manually labeled prior to any processing of the cluster analysis. The identification of emergent user behavior enables the subject system to treat users differently based on their in-game behavior and to adapt in near real-time to changes in their behavior.

The subject technology provides advantages such as potentially cutting costs by identifying bad actors and increasing revenue for game publishers by improving player satisfaction that leads to higher retention, which leads to better monetization. The subject system provides additional advantages including reducing the number of fraudulent item listings being generated on an electronic marketplace, maintaining all transactions (including purchases and sales) within the boundaries of the electronic marketplace, and maintaining a fair interactive environment for all players from novice levels to experienced levels.

Although many examples provided herein describe a user's search inputs being identifiable (e.g., a user's transactional history identifying the user's interactions with content items from an auction house), or download history for content items being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for interactive computer-operated agents for user engagement in an interactive environment suitable for practicing some implementations of the disclosure. The architecture 100 includes one or more servers 130 and clients 110 connected over a network 150.

One of the many servers 130 is configured to host virtual-world data, such as virtual-world data corresponding to a life simulation. For purposes of load balancing, multiple servers 130 can host the real-world data. The server 130 may further be configured to host simulations for multiple clients 110. For example, the server 130 may host a multiplayer simulation for multiple clients 110 to connect to, such that the multiple clients 110 experience the same simulation at approximately the same time.

The clients 110 include one or more computing devices. The clients 110 may include devices capable of running a simulation engine, such as a sports game, for simulating sporting events. For example, the clients 110 may include stationary video game consoles, tablets, mobile devices, laptop computers, desktop computers, and/or other devices capable of running a sports game.

The disclosed system uses virtual-world data from one or more virtual events to drive a life simulation where users have dominion over the content. The server 130 sends the virtual-world data to one or more clients 110, which uses the virtual-world data in generating and running the simulation. As such, the disclosed system can, for example, create a fairly accurate simulation of real-life events without requiring a complete digitizing of the real-life event, or an extensive reconfiguration of a simulation engine.

The servers 130 can be any device having an appropriate processor, memory, and communications capability for hosting real-world data. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Automated Detection of Emergent Behaviors

Figure 2:
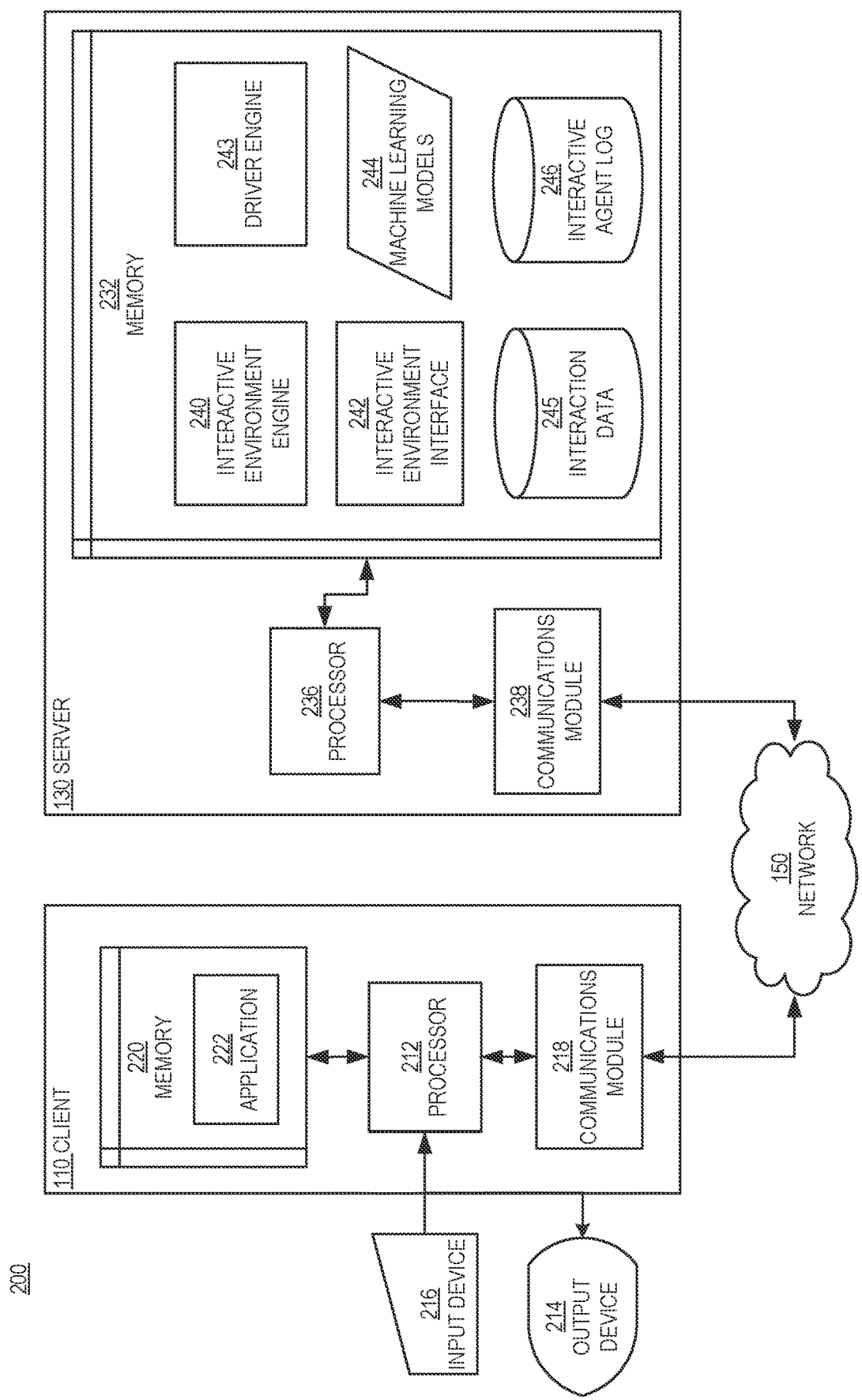
FIG. 2 is a block diagram illustrating the example device and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes an interactive environment engine 240, an interactive environment interface 242, and a driver engine 243. The processor 236 of the server 130 is configured to execute instructions, such as instructions physically coded into the processor 236, instructions received from software in the memory 232, or a combination of both.

The memory 232 also includes machine learning models 244. In one or more implementations, the machine learning models 244 represent respective configurations that utilize input parameters (e.g., number of games played, coin balance, number of logins), and produces a dataset of prediction values indicating the behavior signature of a given user based on the corresponding input parameters. In this respect, the configurations can yield different behavior signatures that correspond to respective clusters of behavior. In some aspects, the machine learning models 244 can output multiple datasets corresponding to different behavioral clusters based on random user interaction parameters.

The machine learning models 244 can use clustering algorithms, such as, but not limited to, nearest neighbor or K-nearest neighbor. In addition, the subject system compares the time-series of results automatically (e.g., hour-by-hour). In some aspects, the machine learning models 244 can evaluate the results by predicting the similarities and differences between emergent behaviors and/or emergent users. In other aspects, the detected emergent behavior clusters and/or emergent users can be labeled manually based on the new behavior or user type, respectively.

The machine learning models 244 may be an output from an artificial neural network, in which the machine learning models 244 represents a machine-learning model that can accept a current context as input and generate a new outcome selection based on the received current context input. In this respect, the selections made in the interactive environment are primarily discrete. In one or more implementations, the machine learning models 244 may be a series of neural networks, one neural network for each user type classification. As discussed herein, the machine learning models 244 are a type of feed-forward artificial neural network where individual neurons are tiled in such a way that the individual neurons respond to overlapping regions in a visual field. The architecture of the machine learning models 244 may be in the object of existing well-known machine learning architectures such as AlexNet, GoogLeNet, or Visual Geometry Group models. In one or more implementations, each of the machine learning models 244 consists of a stack of convolutional layers followed by a single fully connected layer. In this respect, the fully connected layer is the layer that maps the convolutional features to one of a plurality of training classes. The machine learning models 244 can include a loss layer (e.g., softmax or hinge loss layer) to back propagate errors so that the machine learning models 244 learns and adjusts its weights to better fit provided input data.

Also included in the memory 232 of the server 130 is interaction data 245. In certain aspects, the processor 236 is configured to determine the interaction data 245 by obtaining user interaction data identifying interactions between an interactive agent and the interactive environment, where each of the interactions may correspond to different types of activity of the interactive environment. In some aspects, the interaction data 245 may include measurements indicating a number of interactions initiated by a user-controlled agent with respect to a computer-operated agent. The interaction data 245 may indicate the number of logins that a particular user via a corresponding user-controlled agent has with respect to the interactive environment, the virtual coin balance of a particular user, and the number of games played (or multi-user sessions joined) over a predefined period of time. The processor 236 may keep track of the user interactions with a number of interactive agents over a given time period.

The memory 232 also includes an interactive agent log 246. The interactive agent log 246 includes a listing of computer-operated agents that are available for instantiation to a multiuser session. The number of computer-operated agents listed in the interactive agent log 246 may correspond to the number of user accounts (or profiles) that are kept in circulation. In this respect, if a user account associated with an emergent behavior is purged, then the corresponding computer-operated agent is purged from the interactive agent log 246, and vice-versa. The interactive agent log 246 may be updated on a periodic basis in some embodiments, or on a non-periodic basis in other embodiments. The interactive agent log 246 may be updated with additional computer-operated agents being added to the pool of computer-operated agents or updated with the removal of emergent computer-operated agents from the interactive agent log 246.

The device 110 includes a processor 212, the communications module 218, and the memory 220 that includes the application 222. The application 222 may be a simulation engine, or physically coded instructions that execute a simulation of a themed event, such as a sports-themed video game, a real-world life simulation video game, a first-person shooter video game, or the like. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in the memory 220, or a combination of both. The processor 212 of the device 110 executes instructions from the application 222 causing the processor 212 to run the sports-themed video game and provide access to an online transaction repository, where content items such as digital trading cards associated with the sports-themed video game can be purchased, sold, auctioned or exchanged with other participants in the sports-themed video game through the server 130.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIGS. 3A-3D illustrate schematic diagrams depicting a cluster analysis for automated detection of emergent behaviors in interactive agents of an interactive environment. Referring to FIG. 3A, a plot 310 depicts a machine-learning-based cluster analysis that takes a set of items (e.g., users) and sets a value for N different dimensions for each item, where N is a positive integer. Each dimension is labeled to identify a different player attribute (or metric). For example, the number of metrics can vary in a range of 50 to 100 different metrics. The metrics measured include, but are not limited to, human-to-human games played, login frequency, coin balance, frequency wins/losses, the types of different games played, the duration of time a user interacts with a game, frequency of user logging in from same device, or frequency of user logging in from same network address. In FIG. 3A, for example, the three-dimensional space is bounded by three labeled metrics, namely the number of games played (y-axis), the number of logins (x-axis), and the coin balance (z-axis).

The items are mapped into an N-dimensional space and the proximity between the data points are analyzed in order to group the items into groups. In FIG. 3B, a plot 320 depicts items that are grouped into three clusters, namely cluster 321, cluster 322 and cluster 323. Each group (or cluster) has a "center" with an n-dimensional location. The distance between all of the centers can be calculated. For each cluster, the subject system identifies the closest neighboring cluster, then identifies the dimensions that have the greatest distance between those nearest neighbors. As a result, a number of dimensions (e.g., the top 3, the top 5) that differentiate each cluster from its nearest neighbors is identified. In this respect, the subject system classifies the cluster with the identified dimensions. For example, the subject system uses the 3 (or 5) labeled dimensions to "name" the cluster. For example, the cluster 321 may be labeled as "high coin balance" cluster, the cluster 322 may be labeled as "low coin balance/medium login frequency" cluster, and the cluster 323 may be labeled as "low login/high gameplay" cluster.

In FIG. 3C, at a subsequent time, a plot 330 depicts a machine-learning-based cluster analysis being performed again and compares the resulting clusters to those clusters from the prior cluster analysis. If most of the user behavior has remained unchanged, then the set of clusters will remain unchanged. If a new user behavior emerges, then the subject system can identify and label the new user behavior as a new cluster with the cluster analysis. In this respect, emergent behavior can be identified. In some aspects, the emergent behavior is identified as a new combination of users with different values for the same measured dimensions.

In FIG. 3D, a plot 340 depicts items that are grouped into four clusters, namely cluster 341, cluster 342, cluster 343, and cluster 344. For brevity and explanatory purposes, the cluster 341 corresponds to the cluster 321, the cluster 342 corresponds to the cluster 322 and the cluster 343 corresponds to the cluster 323. The subject system processes the measured items and detects whether individual items have moved from one cluster into a different cluster. For example, user 322-1 (originally associated with the cluster 322 in FIG. 3B) has moved to a different cluster, namely the cluster 341. In this regard, the user 322-1 has changed its behavior. As part of the cluster analysis, the subject system analyzes which were the same behaviors (or the same clusters) and what type of cluster did the user previously belong to. For example, the subject system determines which of the other users were originally associated with the cluster 322 and are still present in the cluster 342, thereby indicating that these users have not changed their behavior. The cluster 344 is detected as a new cluster, which indicates an emergent behavior with respect to the behaviors detected in FIG. 3B. In this regard, the cluster 344 includes users whom exhibited similar behavior signatures that were different from those of the clusters 341, 342 and 343. In this regard, the subject system can identify specific users that change behavior and change that user's status (e.g., rewarding user with digital assets, send message to user to cease activity, or penalize users based on severity or frequency of activity).

Figure 4:
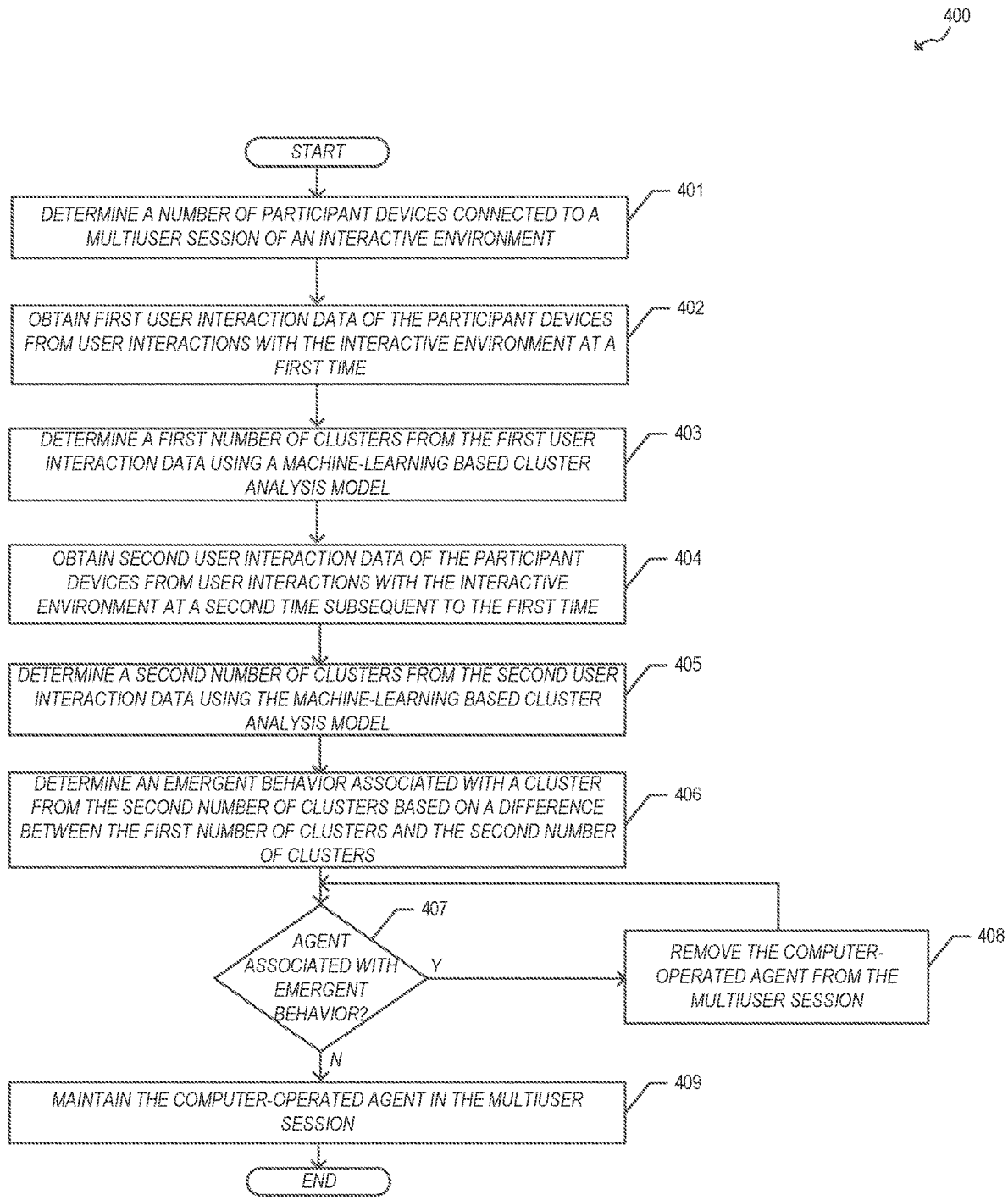
FIG. 4 illustrates an example process of automated detection of emergent behaviors in interactive agents of an interactive environment using the example server of FIG. 2.

FIG. 4 illustrates an example process 400 of facilitating user engagement rates through computer-operated agents in an interactive environment using the example server of FIG. 2. While FIG. 4 is described with reference to FIG. 2, it should be noted that the process steps of FIG. 4 may be performed by other systems. The process 400 begins by proceeding from start step to step 401 where the processor 236, using the driver engine 243, determines a number of participant devices connected to a multiuser session of an interactive environment.

Next, in step 402, the processor 236 obtains first user interaction data of the participant devices from user interactions with the interactive environment at a first time. Subsequently, in step 403, the processor 236 determines a first number of clusters from the first user interaction data using a machine-learning based cluster analysis model.

Next, in step 404, obtains second user interaction data of the participant devices from user interactions with the interactive environment at a second time subsequent to the first time. Subsequently, in step 405, the processor 236 determines a second number of clusters from the second user interaction data using the machine-learning based cluster analysis model. Next, in step 406, the processor 236 determines an emergent behavior associated with a cluster from the second number of clusters based on a difference between the first number of clusters and the second number of clusters.

Subsequently, in step 407, the processor 236 determines whether an interactive agent of the second number of clusters is associated with the detected emergent behavior. If the interactive agent is determined to be associated with the detected emergent behavior, then the process 400 proceeds to step 408. Otherwise, the process 400 proceeds to step 409. In step 408, the processor 236 adjusts the status of a user associated with the interactive agent by removing the interactive agent from the multiuser session when it is determined that the interactive agent is associated with the emergent behavior. Next, in step 409, the processor 236 maintains the interactive agent in the multiuser session when it is determined that the interactive agent is not associated with the emergent behavior.

Figure 5:
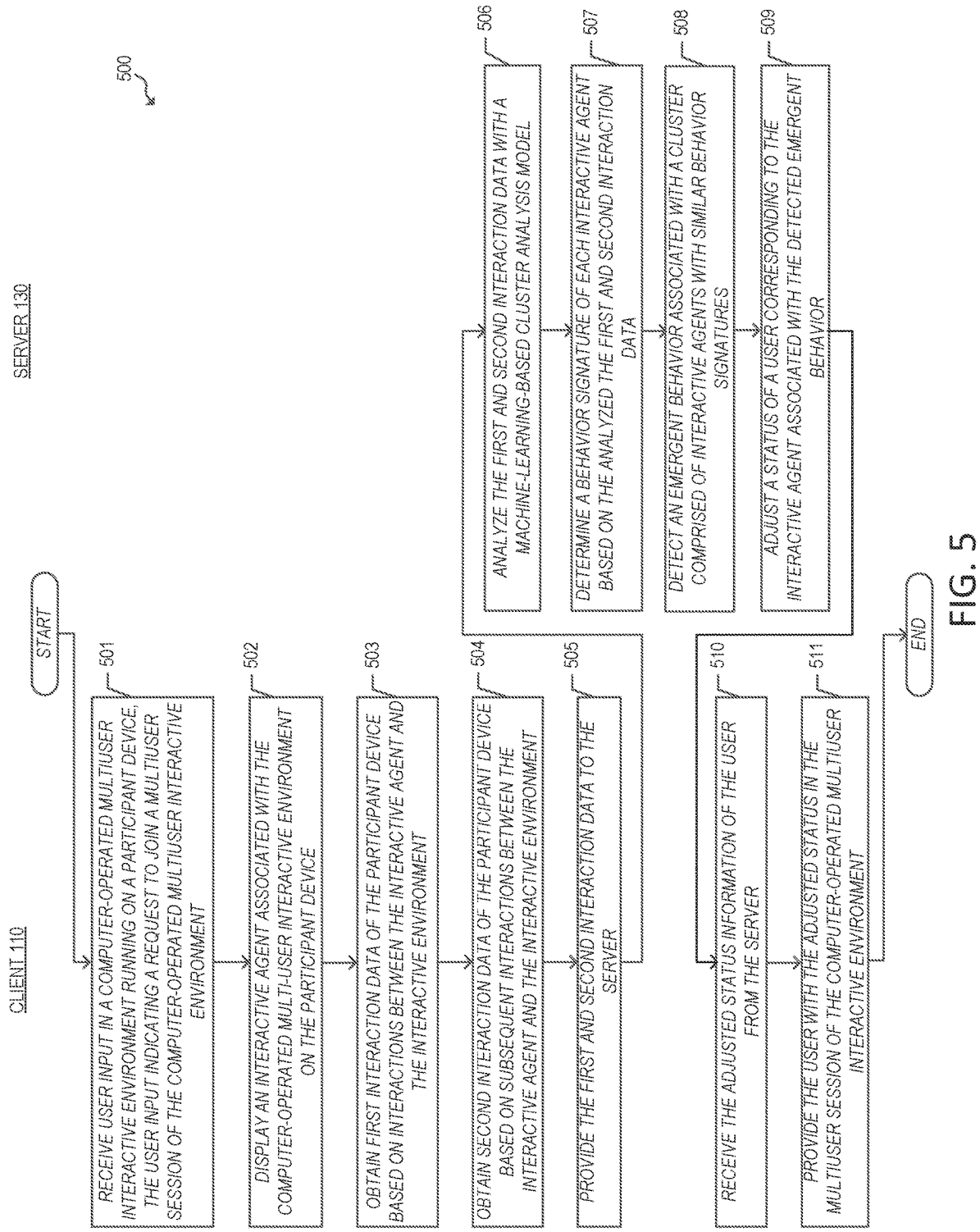
FIG. 5 illustrates an example process of automated detection of emergent behaviors in interactive agents of an interactive environment using the example client and server of FIG. 2.

FIG. 5 illustrates an example process 500 of facilitating user engagement rates through computer-operated agents in an interactive environment using the example client and server of FIG. 2. While FIG. 5 is described with reference to FIG. 2, it should be noted that the process steps of FIG. 5 may be performed by other systems. The process 500 begins in step 501 when a user, for example, loads an application 222 on a client 110 such as a computer-operated multiuser interactive environment running on the client 110, and the client 110 receives an input from the user in using the input device 216. In some implementations, the input indicates a request to join a multiuser session of the computer-operated multiuser interactive environment.

Next, in step 502, the application 222 on the client 110 provides for display an interactive agent associated with the computer-operated multi-user interactive environment on the participant device (e.g., the client 110). In step 503, the client 110 obtains first interaction data of the client 110 based on interactions between the interactive agent and the interactive environment. Subsequently, in step 504, the client 110 obtains second interaction data of the client 110 based on subsequent interactions between the interactive agent and the interactive environment. Next, at step 505, the client 110 provides the first interaction data and the second interaction data to the server 130.

Now turning to the server 130, in step 506, the server 130 analyzes the first interaction data and the second interaction data with a machine-learning-based cluster analysis model. Subsequently, in step 507, the server 130 determines a behavior signature of each interactive agent based on the analyzed first and second interaction data. Subsequently, at step 508, the server 130 detects an emergent behavior associated with a cluster comprised of interactive agents with similar behavior signatures. Next, at step 509, the server 130 adjusts a status of a user corresponding to the interactive agent associated with the detected emergent behavior.

Now turning back to the client 110, in step 510, the client 110 receives the adjusted status information of the user from the server 130. Next, in step 511, the client 110 provides the user with the adjusted status in the multiuser session of the computer-operated multiuser interactive environment via the application 222 of the client 110. In some aspects, the change of status of the user may include rewarding the user with digital assets for continuous non-malicious activity, warning notification to the user about possible violations from non-malicious activity, or penalizing the user by removing the user (and associated account information) from the interactive environment. For example, being associated with emergent behavior does not necessarily mean a user is a bad actor and should be removed. It might also mean that the user is engaging with the game in a new way, which might be something that could be encouraged. Therefore, users may be rewarded or punished as a result of displaying the emergent behavior.

Figure 6:
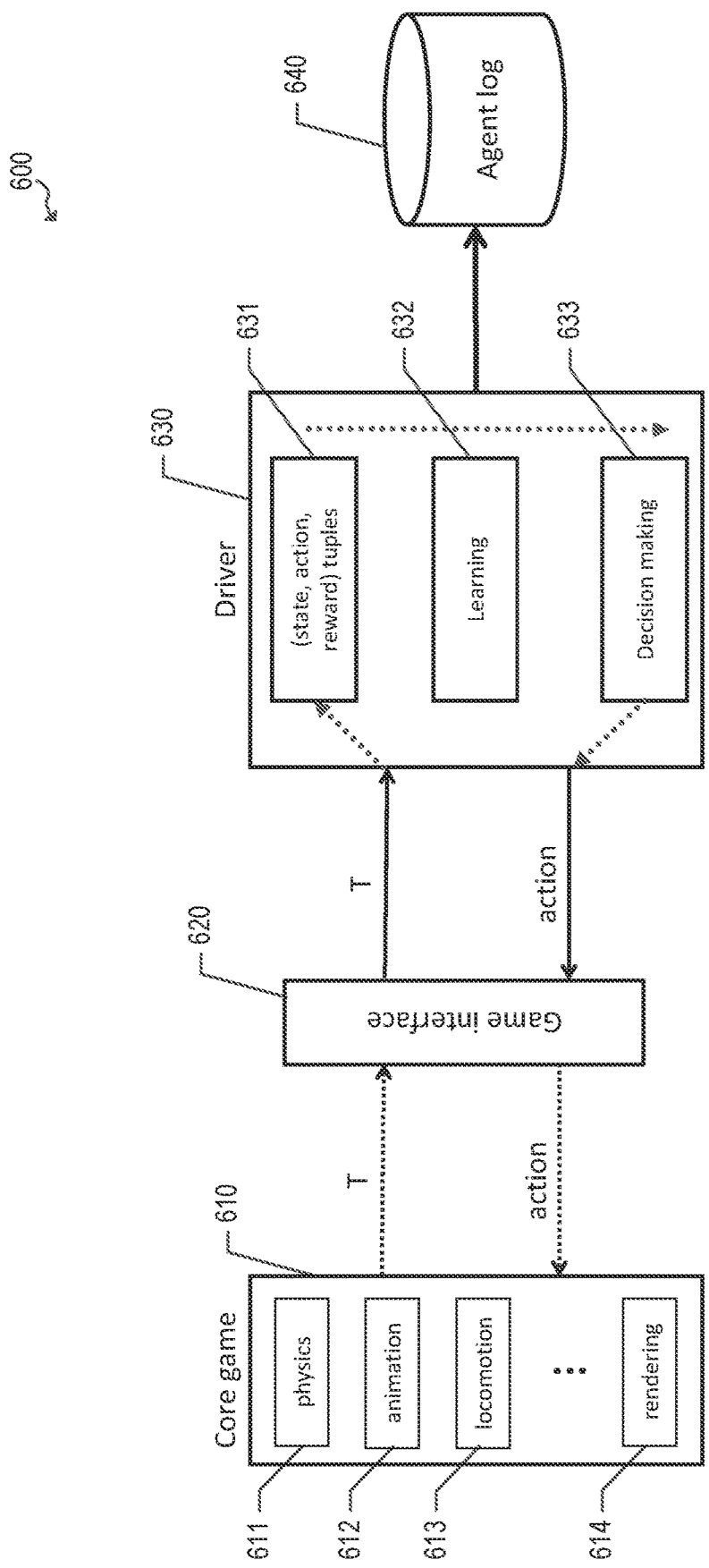
FIG. 6 illustrates a schematic diagram of an example interface between a driver and interactive agents using the example server of FIG. 2.

FIG. 6 illustrates a schematic diagram 600 of an example interface between a driver and interactive agents using the example server of FIG. 2. In FIG. 6, the schematic diagram 600 illustrates a driver 630 (e.g., the driver engine 243), a game interface 620 (e.g., interactive environment interface 242), an agent log 640 (e.g., the interactive agent log 246), and a core game 610 (e.g., the interactive environment engine 240). The driver 630 includes a tuples data engine 631, a behavioral model engine 632, and a decision-making engine 633. The core game 610 includes a physical engine 611, an animation engine 612, a locomotion engine 613, and a rendering engine 614. The driver is communicably coupled to the core game via the game interface 620. The game interface 620 is configured to receive a pairing of state information and reward information from the core game 610, and receives action information from the driver 630.

In one or more implementations, the driver engine 243 is remote to the client 110, and accessible to the client 110 over a network. The driver engine 243 may be part of the server 130 in some embodiments, or remotely accessible to the server 130 while maintaining a remote connection to the client 110 in other embodiments. The driver engine 243 can communicate data that indicates a decision as to which action to take based on a given context and/or rules that apply to a particular behavioral model. In one or more implementations, the driver engine 243 is configured to accept a tuple of data as input, which consists of a state value, an action value and a reward value. The driver engine 243 can run one of the machine learning models 244 and output a decision value for the behavioral model based on the received tuple of data. The output from the driver engine 243 carrying the decision value can be fed back to the interactive environment engine 240 via the interactive environment interface 242 to render an animation sequence that represents an action by the computer-operated agent. The driver engine 243 also provides an output to the interactive agent log 246, such as updates to the state information about the interactive environment. In some implementations, the state information is modified based on an occurrence of the emergent behavior.

In some implementations, the core game 610 via the driver 630 detects emergent behavior when a new cluster arises that represents a group of actors that have a pattern of behavior that was not present before. This new cluster may represent a first type of users with corresponding behavior (e.g., game players with good intentions reacting to a change in the game content), or represent a second type of users with corresponding behavior (e.g., bots that have a found a new manner to exploit the game). In some implementations, additional analysis may be performed on the cluster data to determine a course of action (e.g., reward user, notify user with warning, penalize user, or remove user).

In some implementations, the core game 610 via the driver 630 detects changes in individual player behavior when a player moves from one cluster to another cluster, which indicates that player has changed his/her behavior. In this respect, the particular player is detected to have changed his/her behavior when other players with similar characteristics as that player in a prior time (e.g., the immediately prior day) have not changed their behavior. The core game 610 may flag this individual player based on their behavior signature over time. In some implementations, the core game 610 via the driver 630 determines attributes about the behavior signature that caused the player to be flagged for emergent behavior, such as the player became a spender in a short duration of time, the player began performing malicious activity between the measured times, the player began performing non-malicious activity between the measured times, or the like. The core game 610 via the driver 630 also determines what changes in the game content may have been triggered to cause the change in the user's behavior. The core game 610 via the driver 630 also determines whether the triggered changes in the game content should occur more frequently or less frequently depending on the desired behavior signature.

In some aspects, the core game 610 via the driver 630 may generate and send a notification to a certain end user (or group of users) to alert them about detection of any new clusters of users. In some implementations, the machine-learning-based cluster analysis models perform the clustering and the validation of such clustering may be performed manually. In some implementations, the cluster analysis is performed continuously (e.g., hourly or daily) and the results are compared. In some aspects, a user-by-user comparison is performed. For example, clusters of user accounts are compared against each other to determine how/if existing users moved between clusters (e.g., 6 user clusters became 7 as a bot emerged as a new user account).

Figure 7A:
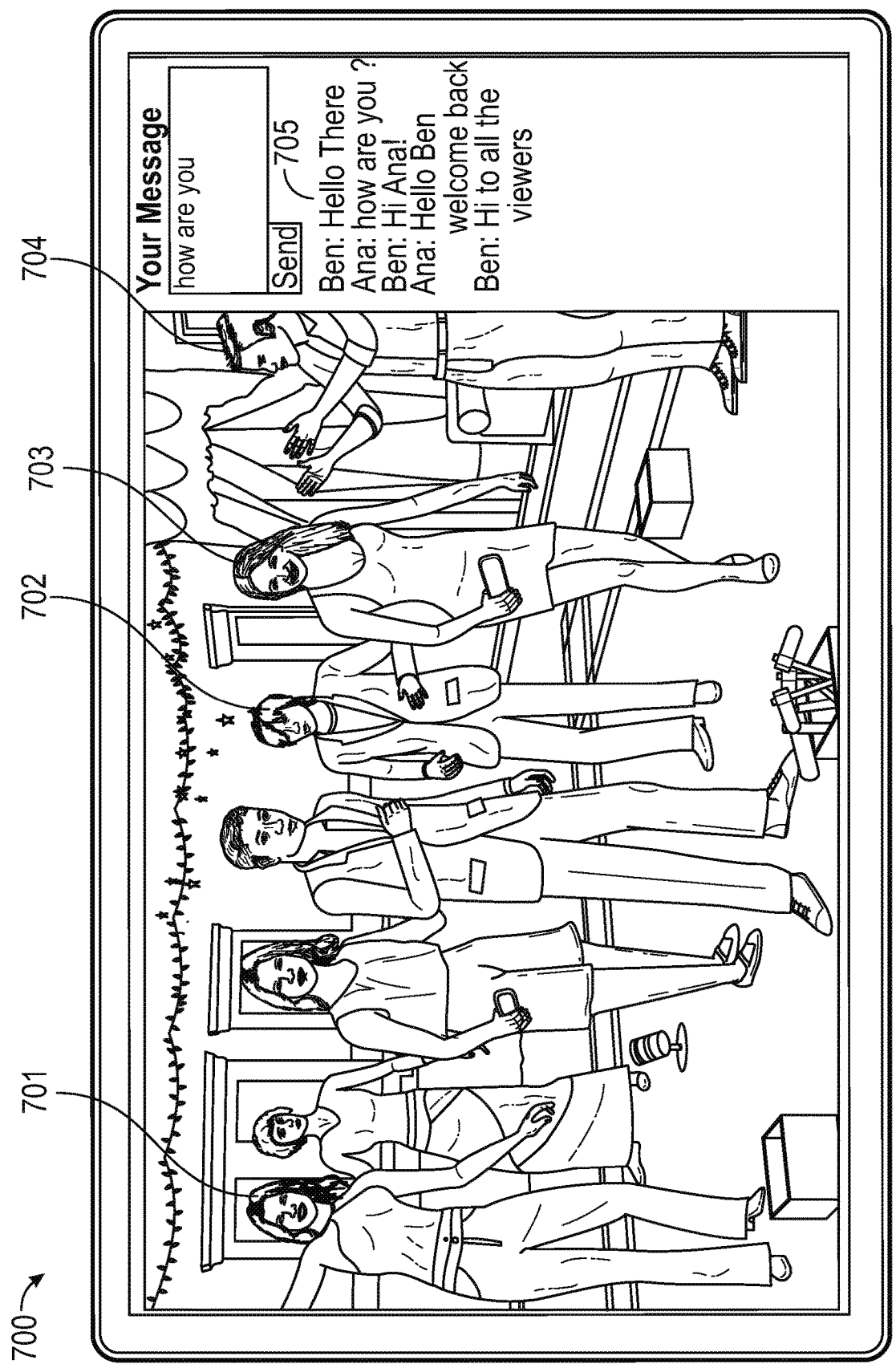
FIGS. 7A and 7B illustrate examples of a user interface for practicing the example process of FIG. 4.

FIG. 7A illustrates an example of a user interface 700 for practicing the example process of FIG. 4. The user interface 700 includes a screen capture of computer-operated agents interacting with users via the user-controlled agents during gameplay. The screen capture illustrates a scene where the computer-operated agents are performing behaviors that cause them to interact with the users. The screen capture includes an animated representation of a computer-operated agent 701, an animated representation of a user-controlled agent 702 associated with a user invited to join and participate in the multiuser session, an animated representation of a user-controlled agent 703 associated with the user that created the multiuser session, and an animated representation of a computer-operated agent 704 configured to interact with the user-controlled agent 702 and/or the user-controlled agent 703. The user interface 700 also includes a messaging interface 705, where a user participating in the multiuser session can write and send a message to another user and/or to a character that is one of the computer-operated agents (e.g., 701, 704). The messaging interface 705 provides for display the outgoing and incoming messages between the user and the recipient agent. In a case where a computer-operated agent is the targeted recipient of messages from the user via the messaging interface 705, the computer-operated agent may generate a response to each message from the user based on a behavioral response distribution from the behavioral model that corresponds to the computer-operated agent.

Figure 7B:
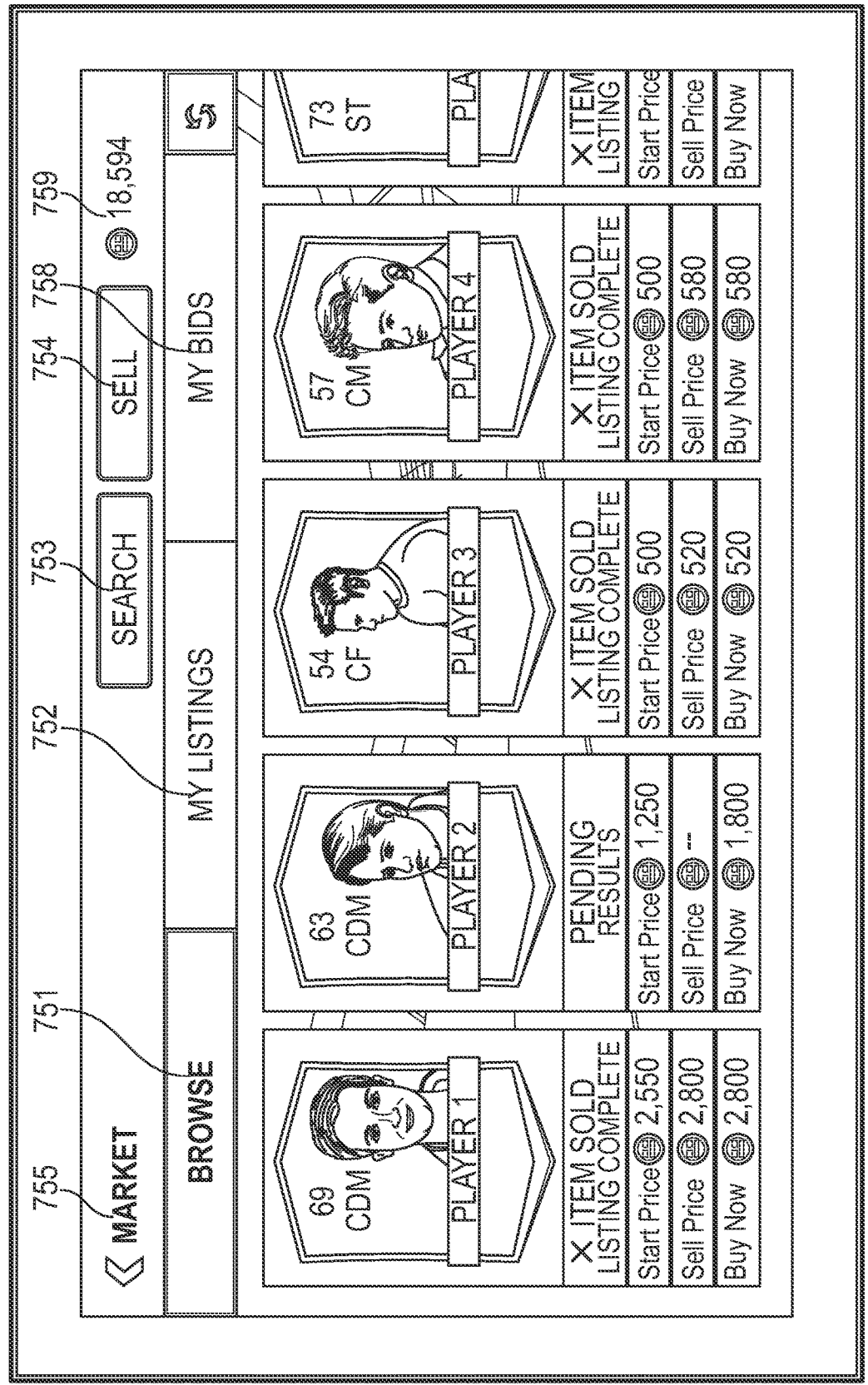

FIG. 7B illustrates an example of a user interface 750 for practicing the example process of FIG. 4 via the application 222 of the client 110. In FIG. 7, the user interface 750 depicts a landing page where a user via an interactive agent of the interactive environment can search for items on an online transaction repository associated with the interactive environment. The user interface 750 of the application 222 includes a navigation bar composed of a browse control 751, listings control 752, and active bids control 758. The navigation bar may include a back operation to visit a prior page (or landing page) such as a marketplace portal (e.g., market 755). In FIG. 750, a listing of content items (e.g., digital trading cards) are displayed in a sequential-based layout but the listing of content items may be in a different layout depending on implementation. The listing of content items may be displayed as an array, where a user may scroll the array to display additional content items. The listing of content items may include images depicting game characters (e.g., depiction of players of a professional sporting league, players of a life simulation, or the like). The user interface 750 also includes a search control 753 and a transaction control 754. The search control 753 may be utilized to search for active listings from other users. The transaction control 754 may be utilized to initiate one or more transactions of a given content item. The user interface 750 also includes an indication of a quantity of digital coins (e.g., 759) earned and/or purchased by a user (e.g., a tally of digital coins associated with a user's account or profile).

In FIGS. 7A and 7B, the interactive agents (hosted by clients) connect to the server to join a session of the interactive environment (e.g., to play games). A user has a unique client identifier, in which the bots can copy and use to spoof the identity of the real user for malicious reasons. The objective is to identify bad users based on their behavior. For example, the subject technology identifies bad users by determining a corresponding behavior signature. The subject technology creates a large n-dimensional graph of users, where the dimensions are player attributes. Users of the interactive environment are grouped into clusters, and a cluster analysis is performed with machine learning models. Based on cluster analysis, the objective of the subject technology is to identify malicious bots and stop them from breaking features in the interactive environment.

Upon release of a new feature in the interactive environment or detection of an emergent behavior in the interactive environment, the objective of the subject technology is to identify a new category of users (e.g., identity of users who have moved between categories of behavior in response to the new feature or change in the interactive environment). In this respect, the subject system determines the new categories based on behavior of the new emergent user or emergent behavior among a group of users.

Hardware Overview

Figure 8:
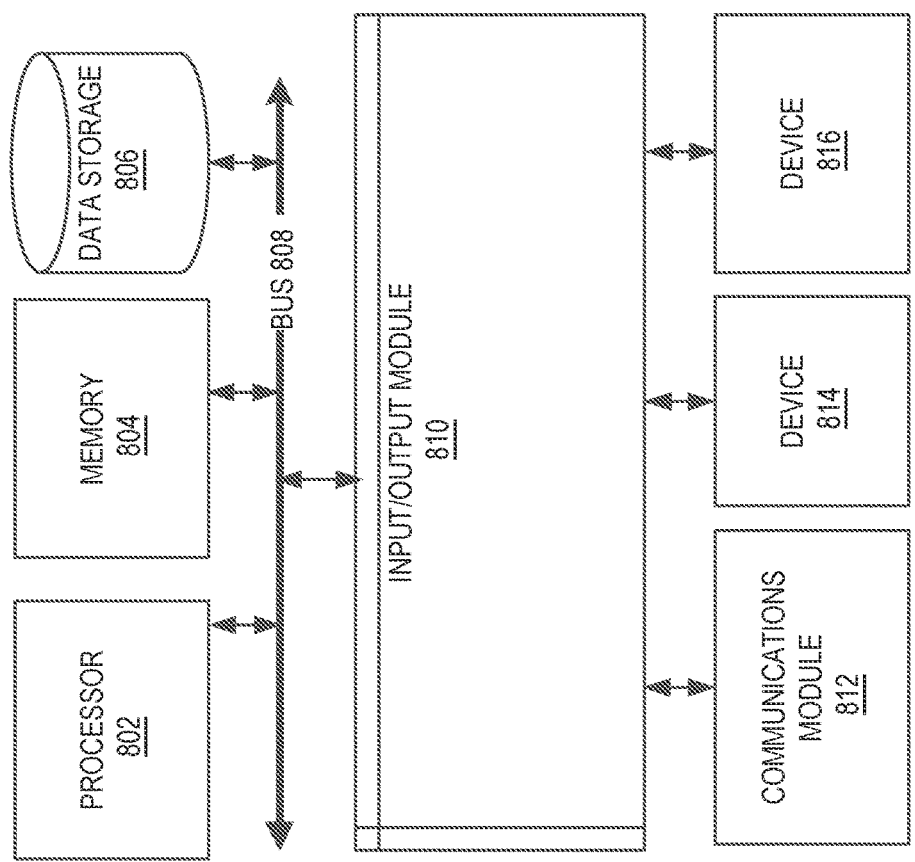
FIG. 8 is a block diagram illustrating an example computer system with which the client and server of FIG. 2 can be implemented.

FIG. 8 is a block diagram illustrating an exemplary computer system 800 with which the client 110 and server 130 of FIG. 1 can be implemented. In certain aspects, the computer system 800 may be implemented using hardware or a combination of software and hardware, either in a dedicated server, integrated into another entity, or distributed across multiple entities.

Computer system 800 (e.g., client 110 and server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 216) and/or an output device 816 (e.g., output device 214). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as a LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A system, comprising:
   a processor; and
   a memory comprising instructions stored thereon, which when executed by the processor, cause the processor to:
   obtain first user interaction data of a participant device from a multiuser session of an interactive environment based on user interactions with the interactive environment at a first time;
   determine a first number of clusters from the first user interaction data using a machine-learning-based cluster analysis model;
   obtain second user interaction data of the participant device from user interactions with the interactive environment at a second time subsequent to the first time;

determine a second number of clusters from the second user interaction data using the machine-learning-based cluster analysis model;

determine an emergent behavior associated with a cluster from the second number of clusters based on a difference between the first number of clusters and the second number of clusters;

determine whether an interactive agent from the second number of clusters is associated with the emergent behavior;

adjust a status of a user corresponding to the interactive agent when the interactive agent is associated with the emergent behavior;

maintain the status of the user corresponding to the interactive agent when the interactive agent is not associated with the emergent behavior; and cause display of the interactive agent through a user interface.

2. The system of claim 1, wherein the instructions cause the processor to:

process the first user interaction data and the second user interaction data with the machine-learning-based cluster analysis model to predict similarities and differences between interactions of different interactive agents for each of a plurality of metrics being measured.

3. The system of claim 2, wherein the instructions cause the processor to:

determine a plurality of items from the first user interaction data and the second user interaction data, wherein each of the plurality of items represents a different interactive agent of the interactive environment;

map the plurality of items to an N-dimensional space, where N is a positive integer; and set a metric value for N different dimensions of the N-dimensional space for each item of the plurality of items, wherein each of the plurality of metrics corresponds to one different dimension of the N-dimensional space.

4. The system of claim 3, wherein the instructions cause the processor to:

calculate a proximity between data points on the N-dimensional space to group items of the plurality of items into a plurality of clusters, wherein each of the plurality of clusters has a center with an N-dimensional location;

calculate a distance between centers of the plurality of clusters for each of the plurality of clusters;

determine a closest neighboring cluster of the plurality of clusters based on the calculated distance for each of the plurality of clusters;

determine one or more dimensions of the N-dimensional space that have a greatest distance to the closest neighboring cluster; and classify a cluster with a label that identifies the cluster based on the determined one or more dimensions.

5. The system of claim 4, wherein the instructions cause the processor to:

compare a first metric value of the interactive agent from the first user interaction data to a second metric value of the interactive agent from the second user interaction data;

determine a difference between the first metric value and the second metric value, wherein the first metric value corresponds to a first cluster of the plurality of clusters and the second metric value corresponds to a second cluster of the plurality of clusters, the second cluster being different from the first cluster; and determine that a behavior signature of the interactive agent corresponds to the emergent behavior based on the determined difference and metric values of other interactive agents with similar attributes as that of the interactive agent from the first and second user interaction data corresponding to a same cluster.

6. The system of claim 1, wherein the instructions cause the processor to:

compare a first plurality of clusters mapped from the first user interaction data to a second plurality of clusters mapped from the second user interaction data; and determine at least one of the second plurality of clusters that is not present in the first plurality of clusters, wherein the at least one of the second plurality of clusters represents a group of interactive agents that have a pattern of behavior that is not previously present in the first plurality of clusters, and wherein the pattern of behavior that is not previously present represents the emergent behavior.

7. The system of claim 1, wherein adjusting the status of the user comprises:

removing the interactive agent associated with the user from the multiuser session when the interactive agent is associated with the emergent behavior.

8. A computer-implemented method, comprising:

obtaining first user interaction data of a participant device from a multiuser session of an interactive environment based on user interactions with the interactive environment at a first time;

determining a first number of clusters from the first user interaction data using a machine-learning-based cluster analysis model;

obtaining second user interaction data of the participant device from user interactions with the interactive environment at a second time subsequent to the first time;

determining a second number of clusters from the second user interaction data using the machine-learning-based cluster analysis model;

determining an emergent behavior associated with a cluster from the second number of clusters based on a difference between the first number of clusters and the second number of clusters;

determining whether an interactive agent from the second number of clusters is associated with the emergent behavior;

adjusting a status of a user corresponding to the interactive agent when the interactive agent is associated with the emergent behavior;

maintaining the status of the user corresponding to the interactive agent when the interactive agent is not associated with the emergent behavior; and causing display of the interactive agent through a user interface.

9. The computer-implemented method of claim 8, further comprising:

processing the first user interaction data and the second user interaction data with the machine-learning-based cluster analysis model to predict similarities and differences between interactions of different interactive agents for each of a plurality of metrics being measured.

10. The computer-implemented method of claim 9, further comprising:

determining a plurality of items from the first user interaction data and the second user interaction data, wherein each of the plurality of items represents a different interactive agent of the interactive environment;

mapping the plurality of items to an N-dimensional space, where N is a positive integer; and setting a metric value for N different dimensions of the N-dimensional space for each item of the plurality of items, wherein each of the plurality of metrics corresponds to one different dimension of the N-dimensional space.

11. The computer-implemented method of claim 10, further comprising:

calculating a proximity between data points on the N-dimensional space to group items of the plurality of items into a plurality of clusters, wherein each of the plurality of clusters has a center with an N-dimensional location;

calculating a distance between centers of the plurality of clusters for each of the plurality of clusters;

determining a closest neighboring cluster of the plurality of clusters based on the calculated distance for each of the plurality of clusters;

determining one or more dimensions of the N-dimensional space that have a greatest distance to the closest neighboring cluster; and classifying a cluster with a label that identifies the cluster based on the determined one or more dimensions.

12. The computer-implemented method of claim 11, further comprising:

comparing a first metric value of the interactive agent from the first user interaction data to a second metric value of the interactive agent from the second user interaction data;

determining a difference between the first metric value and the second metric value, wherein the first metric value corresponds to a first cluster of the plurality of clusters and the second metric value corresponds to a second cluster of the plurality of clusters, the second cluster being different from the first cluster; and determining that a behavior signature of the interactive agent corresponds to the emergent behavior based on the determined difference and metric values of other interactive agents with similar attributes as that of the interactive agent from the first and second user interaction data corresponding to a same cluster.

13. The computer-implemented method of claim 8, further comprising:

comparing a first plurality of clusters mapped from the first user interaction data to a second plurality of clusters mapped from the second user interaction data; and determining at least one of the second plurality of clusters that is not present in the first plurality of clusters, wherein the at least one of the second plurality of clusters represents a group of interactive agents that have a pattern of behavior that is not previously present in the first plurality of clusters, and wherein the pattern of behavior that is not previously present represents the emergent behavior.

14. The computer-implemented method of claim 8, further comprising:

removing the interactive agent associated with the user from the multiuser session when the interactive agent is associated with the emergent behavior.

15. A non-transitory computer-readable storage medium is provided including instructions that, when executed by a processor, cause the processor to perform a method, the method comprising:

obtaining first user interaction data of a participant device from a multiuser session of an interactive environment based on user interactions with the interactive environment at a first time;

determining a first number of clusters from the first user interaction data using a machine-learning-based cluster analysis model;

obtaining second user interaction data of the participant device from user interactions with the interactive environment at a second time subsequent to the first time;

determining a second number of clusters from the second user interaction data using the machine-learning-based cluster analysis model;

determining an emergent behavior associated with a cluster from the second number of clusters based on a difference between the first number of clusters and the second number of clusters;

determining whether an interactive agent from the second number of clusters is associated with the emergent behavior;

adjusting a status of a user corresponding to the interactive agent when the interactive agent is associated with the emergent behavior;

maintaining the status of the user corresponding to the interactive agent when the interactive agent is not associated with the emergent behavior; and causing display of the interactive agent through a user interface.

16. The non-transitory computer-readable storage medium of claim 15, wherein the method further comprises:

processing the first user interaction data and the second user interaction data with the machine-learning-based cluster analysis model to predict similarities and differences between interactions of different interactive agents for each of a plurality of metrics being measured.

17. The non-transitory computer-readable storage medium of claim 16, wherein the method further comprises:

determining a plurality of items from the first user interaction data and the second user interaction data, wherein each of the plurality of items represents a different interactive agent of the interactive environment;

mapping the plurality of items to an N-dimensional space, where N is a positive integer; and setting a metric value for N different dimensions of the N-dimensional space for each item of the plurality of items, wherein each of the plurality of metrics corresponds to one different dimension of the N-dimensional space.

18. The non-transitory computer-readable storage medium of claim 17, wherein the method further comprises:

calculating a proximity between data points on the N-dimensional space to group items of the plurality of items into a plurality of clusters, wherein each of the plurality of clusters has a center with an N-dimensional location;

calculating a distance between centers of the plurality of clusters for each of the plurality of clusters;

determining a closest neighboring cluster of the plurality of clusters based on the calculated distance for each of the plurality of clusters;

determining one or more dimensions of the N-dimensional space that have a greatest distance to the closest neighboring cluster; and classifying a cluster with a label that identifies the cluster based on the determined one or more dimensions.

19. The non-transitory computer-readable storage medium of claim 18, wherein the method further comprises:
- comparing a first metric value of the interactive agent from the first user interaction data to a second metric value of the interactive agent from the second user interaction data;
- determining a difference between the first metric value and the second metric value, wherein the first metric value corresponds to a first cluster of the plurality of clusters and the second metric value corresponds to a second cluster of the plurality of clusters, the second cluster being different from the first cluster; and
- determining that a behavior signature of the interactive agent corresponds to the emergent behavior based on the determined difference and metric values of other interactive agents with similar attributes as that of the interactive agent from the first and second user interaction data corresponding to a same cluster.

20. The non-transitory computer-readable storage medium of claim 15, wherein the method further comprises:
- comparing a first plurality of clusters mapped from the first user interaction data to a second plurality of clusters mapped from the second user interaction data; and
- determining at least one of the second plurality of clusters that is not present in the first plurality of clusters, wherein the at least one of the second plurality of clusters represents a group of interactive agents that have a pattern of behavior that is not previously present in the first plurality of clusters, and wherein the pattern of behavior that is not previously present represents the emergent behavior.

* * * * *